United States Patent [19]
Lindsay

[11] Patent Number: 6,073,903
[45] Date of Patent: Jun. 13, 2000

[54] LINEAR FORCE ACTUATORS

[75] Inventor: Richard Arthur Lindsay, Eye, United Kingdom

[73] Assignee: Vitec Group PLC, Bury St. Edmunds, United Kingdom

[21] Appl. No.: 09/051,098

[22] PCT Filed: Mar. 28, 1996

[86] PCT No.: PCT/GB96/00746

§ 371 Date: Apr. 1, 1998

§ 102(e) Date: Apr. 1, 1998

[87] PCT Pub. No.: WO96/30693

PCT Pub. Date: Oct. 3, 1996

[30] Foreign Application Priority Data

Mar. 28, 1995 [GB] United Kingdom ................... 9506324

[51] Int. Cl.⁷ ................................................ F16M 11/26
[52] U.S. Cl. .......................................... 248/404; 254/386
[58] Field of Search ...................... 254/385, 386, 254/392, 900; 248/404, 162.1, 161

[56] References Cited

U.S. PATENT DOCUMENTS

| | | | |
|---|---|---|---|
| 3,743,249 | 7/1973 | Van Daalen | 254/900 |
| 4,540,159 | 9/1985 | Jordan | 254/386 |
| 4,552,339 | 11/1985 | Werners et al. | 254/392 |
| 5,114,109 | 5/1992 | Fitz et al. | 248/404 |
| 5,520,369 | 5/1996 | Chartard | 254/900 |
| 5,820,088 | 10/1998 | Chapman | 248/404 |

FOREIGN PATENT DOCUMENTS

40 31 105  9/1992  Germany.

*Primary Examiner*—Katherine A. Matecki
*Attorney, Agent, or Firm*—Kenyon & Kenyon

[57] ABSTRACT

The disclosure relates to a vertically operating linear actuator for a multi-stage extendible column for carrying a cinematograph or TV camera. A load representing the weight imposed by the multi-stage column with its camera is indicated at (10), a vertically extending gas strut at (11) and a base (12). A piston rod (15) of the strut carries a rotatable disc mounted on a pivot pin eccentrically to its geometric center to provide a varying radius of rotation between the offset center and disc periphery (21). A tether (22) extends over the disc and is secured at one end to an anchorage (23) on the base and the other end supports the load (10). The effective force applied by the strut to the weight (10) will be determined by the effective radii of the disc (20) at points where the tether engages the disc. The varying radii are arranged to compensate for the diminishing force generated by the gas strut (11) at its extends to maintain a constant force on the load (10) so that the latter remains imbalanced throughout its range of movement.

7 Claims, 9 Drawing Sheets

LINEAR FORCE ACTUATORS

BACKGROUND OF THE INVENTION

This invention relates to force actuators and is particularly, although not exclusively, applicable to linear force actuators suitable for supporting a load carried by a linearly extendible member such as a column or arm.

In the fields of cinematography and TV it is common to provide a mobile pedestal for a camera having a vertically extendible column having two or more interlinked stages and incorporating a gas strut to counterbalance at least partially the load of the camera on the column throughout the range of travel of the camera. In some arrangements a clamp is provided to lock the column in any required position of vertical adjustment to prevent drifting up or down when the camera is not supported by the operator. An additional operation in securing the camera position is however undesirable and there has been a demand for a column in which the camera can easily be set to any position of adjustment throughout its travel and will remain in that position untended and without the need for a locking device. It will be appreciated that as a gas strut extends, the volume of pressurised gas contained within the strut increases and therefore the pressure declines thereby reducing the force available from the strut. To minimize the loss of pressure in the strut, an arrangement has been devised in which the strut is connected to a separate pressurised gas reservoir sufficiently large to ensure that the change in volume of the strut with extension is relatively small in relation to the total volume of the strut and reservoir taken together so that diminution in gas pressure is relatively small and therefore the fall-off in applied force is relatively small. This arrangement has the disadvantage that it is necessary to incorporate a comparatively bulky gas reservoir in the pedestal. In the demand for more and more compact arrangements this has become a serious disadvantage.

In a further construction, the ram of the strut is tapered throughout its length and operates through a seal which can expand and contract radially so that the affected area of the ram increases and decreases with extension and contraction. As a result, the area on which the gas pressure of the ram operates increases and decreases and so the force generated by the ram increases and decreases. It is difficult however to make a seal to cope with a tapered ram reliable particularly over a long period of use. Also whilst such an arrangement may be satisfactory for a two stage column, the problem of providing an effective seal which will cater for the degree of taper required for a three or four stage column poses severe design and material problems for the seal. It has therefore become desirable to find an alternative solution to the problem.

SUMMARY OF THE INVENTION

This invention provides a linear actuator for applying force to a moveable component, comprising an extendable gas powered strut for providing a force which varies with extension of the strut from a maximum when the strut is fully retracted to a minimum when the strut is fully extended, and means for transmitting the force provided by the gas strut to a component with a mechanical advantage which increases with the extension of the strut and reduces with contraction to compensate for the variable force produced by the strut and thereby to apply a substantially constant force on a component throughout the range of extension/retraction of the strut, the force transmitting means comprising a planar drive wheel of varying radius mounted for rotation on the strut and a flexible driving element extending around and having a positive driving connection with a part of the periphery of the wheel one end of the element being connected to a separate anchorage spaced from the wheel and the other end being adapted to apply a force to said moveable component, the arrangement being such that the wheel turns through up to about half a turn over the range of travel of the strut and the varying radius of the wheel compensating for the varying thrust of the strut to provide a substantially constant output force on the moveable component.

In one arrangement according to the invention the wheel may be circular and may be mounted for rotation eccentrically of its geometric centre to form a varying radius circumference over which said flexible element engages.

In an alternative preferred arrangement the radius of the wheel is varied around the wheel so that the ratio of the axial component of the load velocity to the strut velocity is equal to the ratio of the strut force to the load force required for balance.

In any of the above arrangements the flexible drive element may be a chain and the varying radius drive wheel is a toothed sprocket with which the chain engages.

The invention also provides a linearly extendible member for supporting a load having a linear actuator according to any of the above arrangements for providing a substantially constant force to support the load thereon throughout the range of extension/contraction of the member.

For example the telescopic member may have a plurality of interconnected stages to extend and retract in unison said linear actuator acts on the telescopic member to extend and retract the member with extension and retraction of the gas strut of the actuator.

In the latter arrangement the flexible driving element of the linear actuator may be connected to one of the stages of the telescopic member to transmit a force from the gas strut to the telescopic member.

The extendible member may be in the form of a vertical column comprising a plurality of stages, a bottom stage of the column being fixed on a base and a first moving stage carrying said wheel an upper stage of the column being adapted to carry a payload, said gas powered strut being mounted on the base and the flexible driving element being anchored to the base at one end and to said upperstage at the other end to cause the column to extend and retract with a substantially constant force on the column to maintain the column supporting the payload in balance throughout its range of extension/retraction.

In the latter case a plurality of said drives may be provided at spaced locations around the axis of the telescopic member.

Preferably three variable ratio drives are provided spaced around the longitudinal axis of the member.

Further one or more one to one drive connections may be provided between the or each pair of respective stages so that the stages extend and contract with respect to one another in unison.

More specifically the or each one to one drive connection may comprise a wheel mounted for rotation towards the upper end of one stage and a flexible element one end of which is anchored at one end to the lower end of the stage below and extends over the pulley and down to an anchorage at the lower end of the stage above to transmit movement between the respective stages.

BRIEF DESCRIPTION OF THE DRAWINGS

The following is a description of some specific embodiments of the invention, reference being made to the accompanying drawings in which.

DETAILED DESCRIPTION OF THE INVENTION

Figure 1:
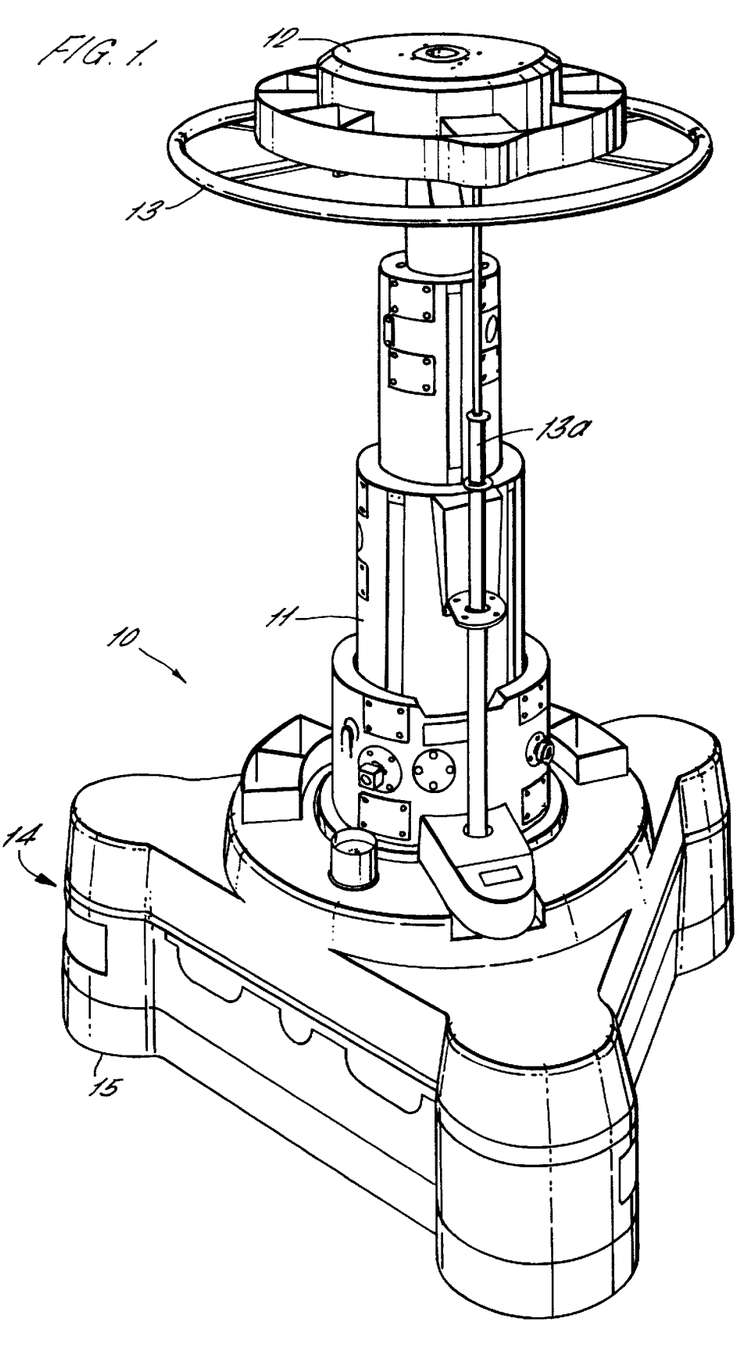
FIG. 1 is a diagrammatic view of a vertically acting linear actuator in accordance with the invention in a contracted condition.
Figure 2:
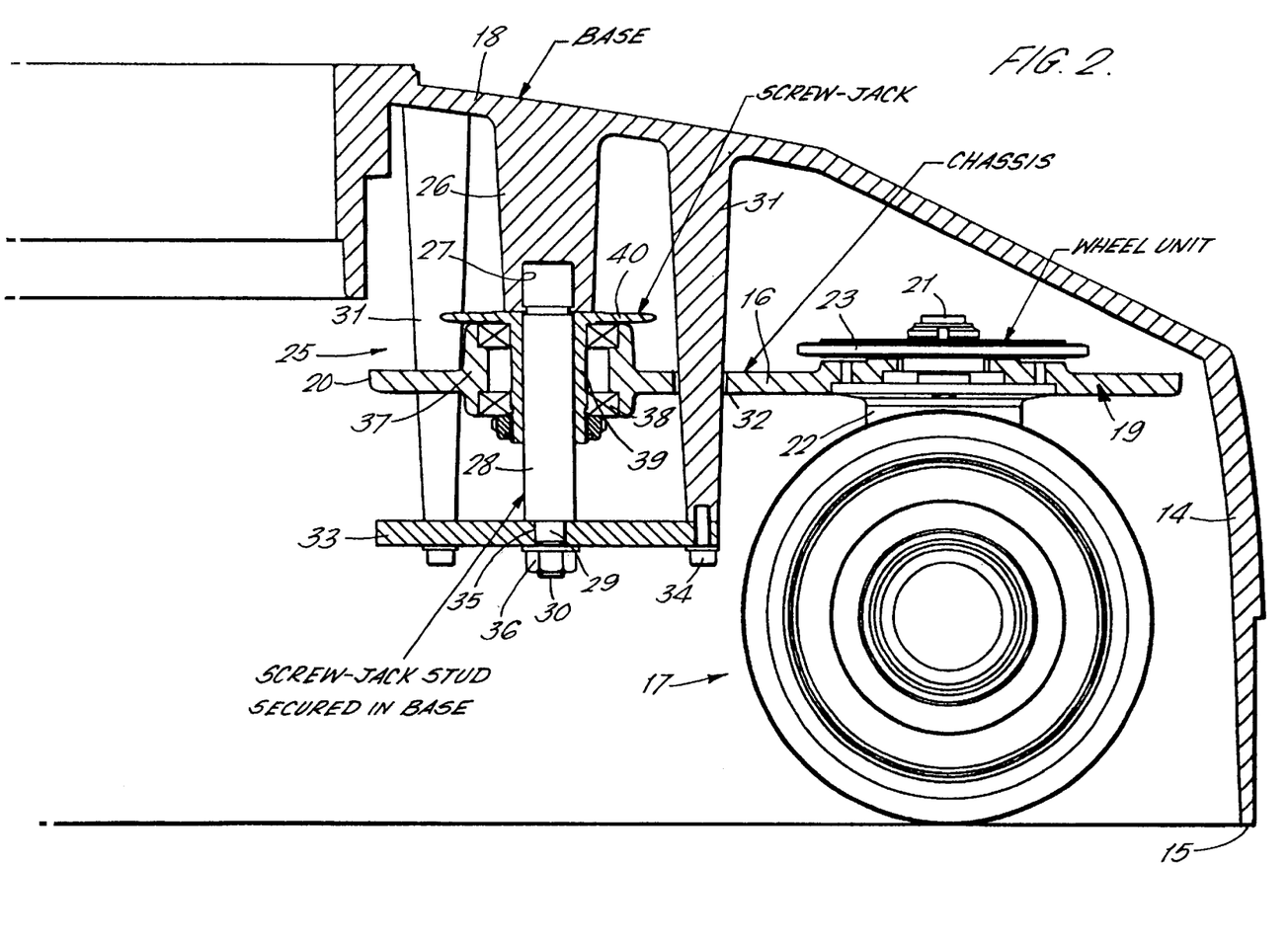
FIG. 2 is a similar view to that of FIG. 1 showing the linear actuator in the extended condition.

Referring firstly to FIGS. 1 and 2 of the drawings, there is shown a vertically operating linear actuator for use in a multi-stage extendible column for carrying a cinematograph or TV camera. A load representing the weight imposed by the multi-stage column with its camera payload is indicated at 10 and a vertically extending gas strut indicated generally at 11 is mounted on a base 12. The gas strut comprises a cylinder 13, piston 14, and piston rod 15 which projects through an end wall 16 at the upper end of the cylinder. The lower end of the cylinder is connected to a closed reservoir of pressurised gas which is not shown.

The end of the piston rod 15 projecting from the end of the cylinder carries a fork 18 in which a pivot pin 19 is mounted. A disk of generally circular form 20 is mounted on the pivot pin slightly off centre from the geometric centre of the disc to provide a varying radius of rotation between the offset centre and disc periphery 21 for a purpose which will be made clear below.

The weight 10 representing the downward force of the extendible column and its camera payload is suspended by a tether 22 which extends over the disc 20 to an anchorage 23 on the base adjacent the gas cylinder 11.

It will be appreciated that as the gas strut 11 is extended vertically to extend the column vertically, gas pressure in the cylinder 13 will decline between a maximum when the gas strut is fully retracted as shown in FIG. 1 and a minimum when the gas strut is fully extended as shown in FIG. 2. As the strut extends, the gas pressure in the strut will fall with the expansion of the spent volume of the cylinder thereby causing the force generated by the strut to decline.

The effective force applied by the strut to the weight 10 will be determined by the effective radii of the disc 20 at a points where the tether engages the disc. With the strut fully retracted as shown in FIG. 2, the disc is arranged to provide a maximum radius as indicated by the dimension 24 to provide the minimum mechanical advantage between the strut and weight. As the strut 11 extends, so the effective radius of the disc 20 reduces (as a result of the eccentric pivoting of the disc) to a minimum when the strut is fully extended as indicated at 25 on FIG. 2 and thereby providing a maximum mechanical advantage. The size of the disc is chosen to provide less than about a half-turn of rotation between the fully extended and fully retracted positions of the strut.

As indicated above, the disc 20 is of generally circular form, that is to say it has a curved profile which approximates closely to the profile of an eccentric circle but the actual profile used which extends over the perimeter of the disc is developed mathematically to provide a true compensation for the varying force applied by the strut to provide a constant force. Thus the decline in force generated by the gas powered strut as the strut extends is fully compensated by the increase in mechanical advantage derived from the reduction in effective radius of the disc acting on the tether and, likewise the increase in the force provided by the strut as it contracts is compensated by an increase in the effective radius of the disc where it acts on the tether. As a result the nett force applied to the weight 10 is substantially constant throughout the range of extension/contraction of the strut.

When the arrangement is incorporated in a vertically extended column carrying a payload such as a TV or cinematograph camera and is arranged to support the weight of the column and camera, a substantially constant force is available throughout the range of movement of the column. Thus, the camera can be set at any required height and is always perfectly counterbalanced by the gas powered strut and disc/tether drive.

Figure 3:
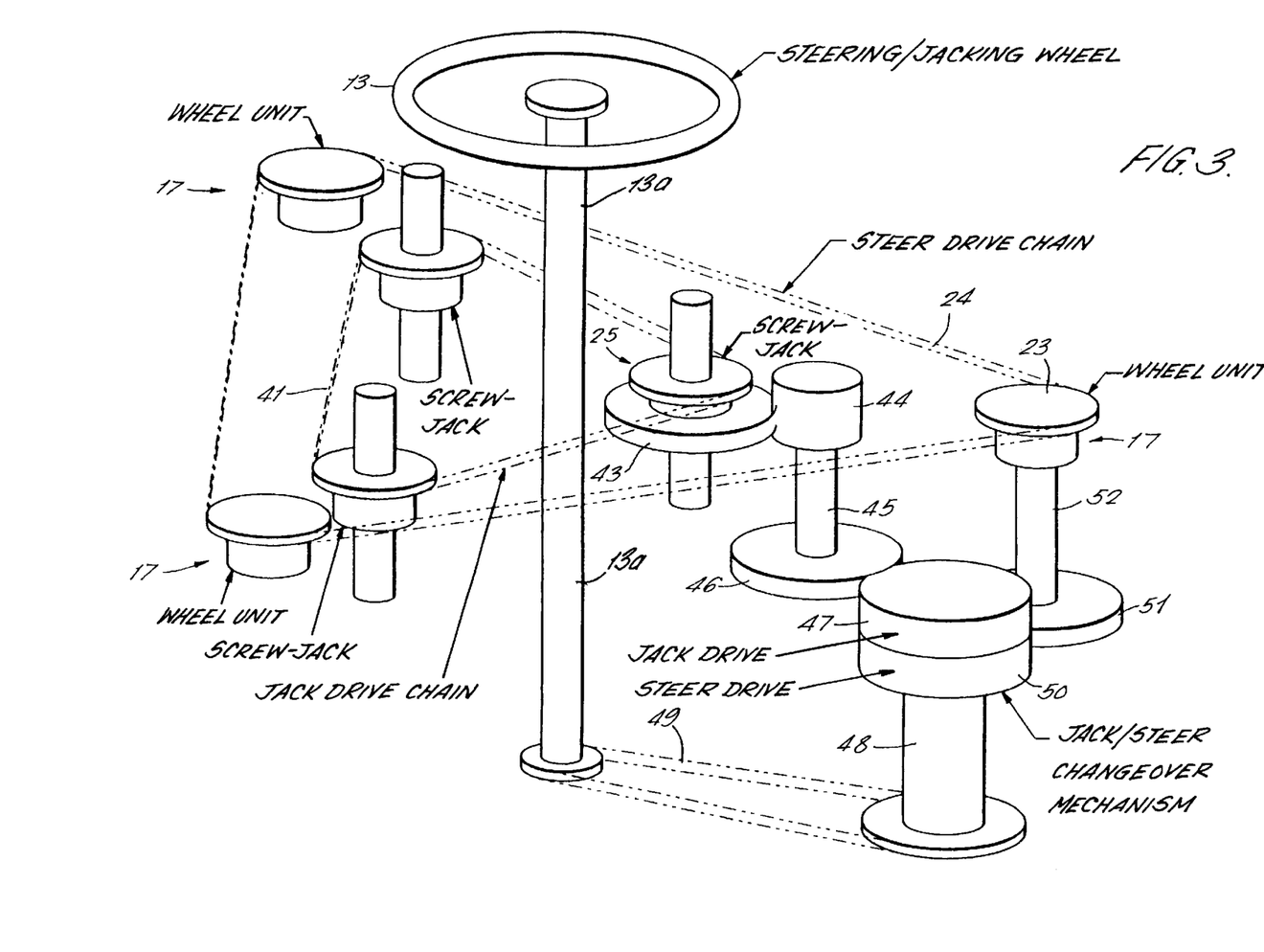
FIG. 3 is an elevation view of a multi-stage extendible column supporting a TV or cinematograph camera embodying a linear actuator constructed in accordance with FIGS. 1 and 2.

Referring now to FIG. 3 of the drawings, there is shown in side elevation a multi-stage extendible column indicated generally at 30 for a TV or cinematograph camera pedestal. The column has a base 31 at its lower end and a mounting plate 29 at its upper end adapted to receive and support the camera. The column comprises a fixed lowermost stage 32 mounted on the base 31 and four telescoping stages 33, 34, 35 and 36, the platform 32 being secured to the uppermost stage 36. Each stage is supported in the stage below by means of upper and lower pairs of bearing sets indicated at 37 and 38, there being three or four such sets equi-spaced around each of the stages 32, 33, 34 and 35 to receive and support the respective stage above.

There are three or four one-to-one chain/sprocket driving connections between the uppermost stage 36 and the next stage 35 below at spaced locations around the column. Each drive connection comprises a toothed sprocket 40 rotatably mounted on stage 25, and a chain 41 anchored at one end to the lower end of stage 36 and extending upwardly over the sprocket 40 and then downwardly to an anchorage (not shown) at the lower end of stage 34. Thus, when the camera operator raises or lowers platform 32 as required, the upper stage 36 will move with the platform and transmit a corresponding movement to stage 35 below. Likewise, there are three or four one-to-one sprocket and chain drive connections between stage 35 and the stages 34 and 33 below and like parts have been given the same reference numerals.

Between stages 34, 33 and 32 there are again three or four sprocket/chain drive connections but in this instance these are of a modified form based on the principals of the arrangement shown in FIGS. 1 and 2. The sprocket indicated at 42 and is mounted on the upper part of stage 33 at 42. The profile of the perimeter of the sprocket is developed to provide the varying radius over the periphery of the sprocket as described earlier. The chain 43 has one end secured at an anchorage 44 to the lower end of stage 34 and its other end secured to an anchorage 45 at the bottom of base 31. Instead of the pneumatic strut 46 acting directly on the pivot pin supporting the sprocket as in FIGS. 1 and 2, the strut 46 acts on the stage 33 but for all practical purposes, the arrangement functions in an identical way to that of FIGS. 1 and 2. Thus, as the strut extends lifting stage 33 out of the fixed stage 32, the varying profile of the sprocket 42 increases the mechanical advantage to compensate for the reduction in gas pressure in the strut as the strut extends its ram so that a substantially constant force is applied by the strut.

Lifting the lower stage 33 raises the stages 34, 35 and 36 above in unison by corresponding amounts through the one-to-one drive connection between respective stages so that the column extends and contracts as a whole. By providing, effectively, a constant force supporting the column throughout its range of extension and contraction, the platform can be moved by the camera operator to any position in its travel and it will remain there without tending to drift upwardly or downwardly even if left untended.

Figure 4:
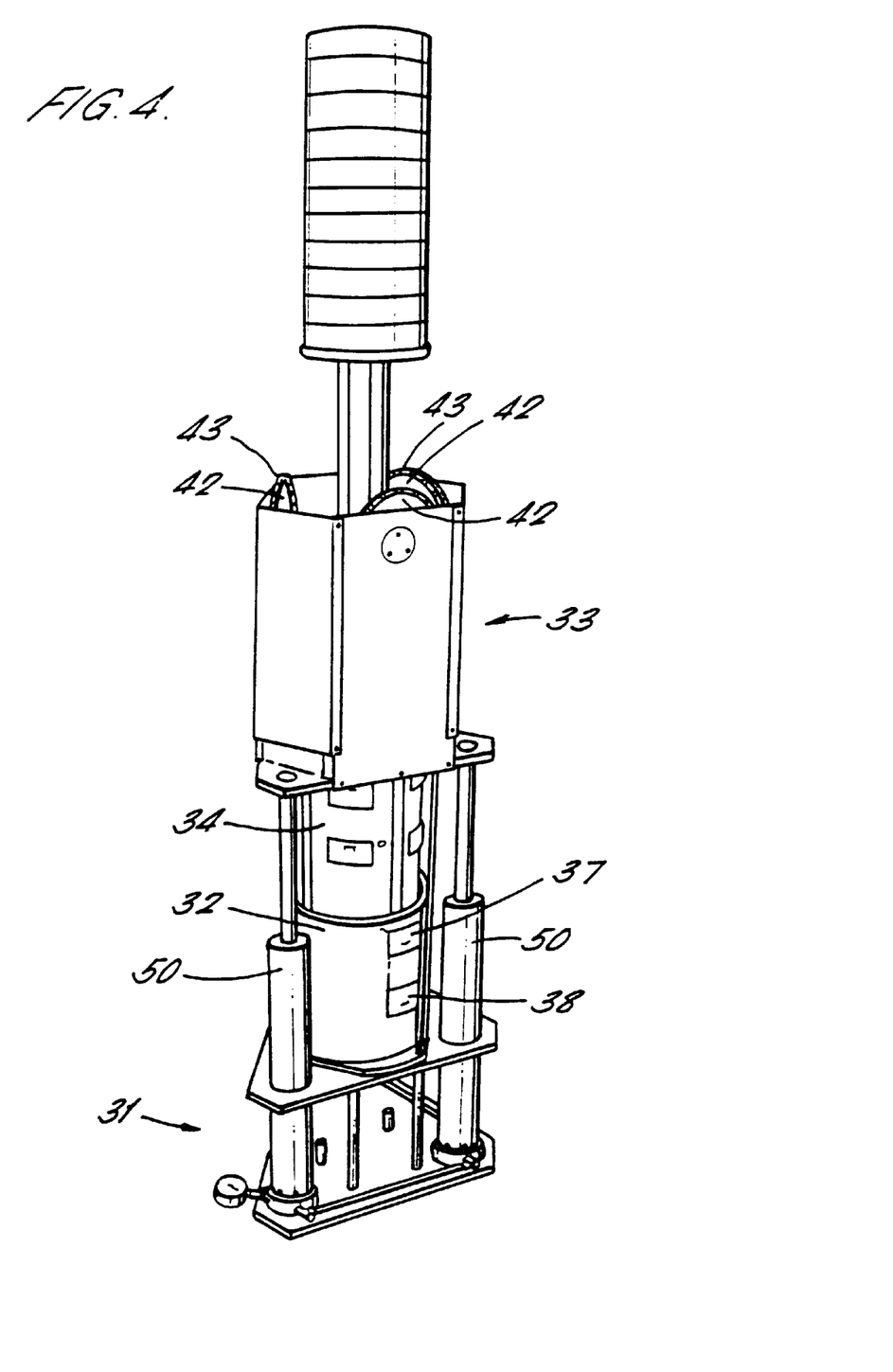
FIG. 4 is a perspective view of a prototype vertically extendible column for carrying a TV or cinematograph camera embodying a linear force actuator according to the invention.
Figure 5:
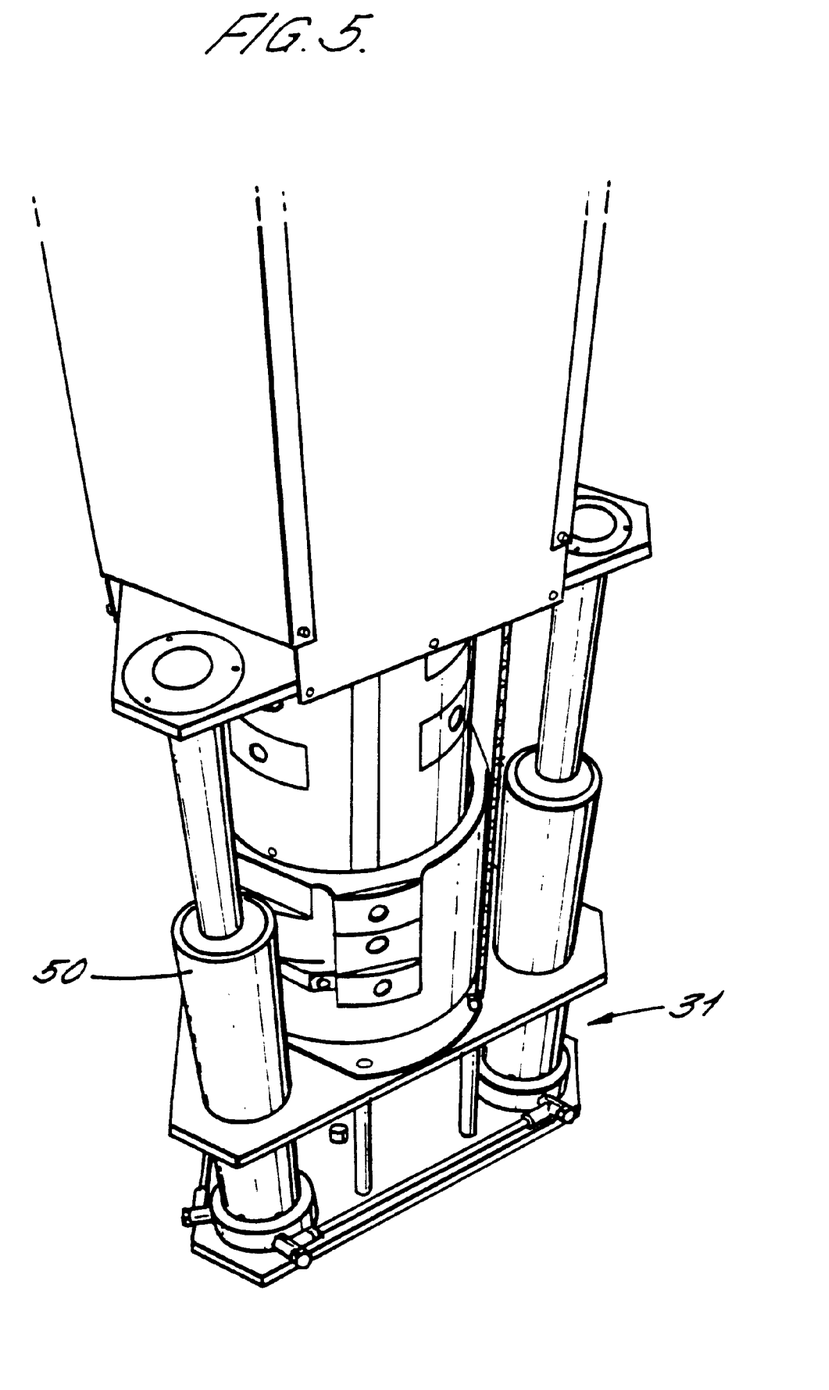
FIG. 5 is a detailed view of a lower part of the column of FIG. 4.
Figure 6:
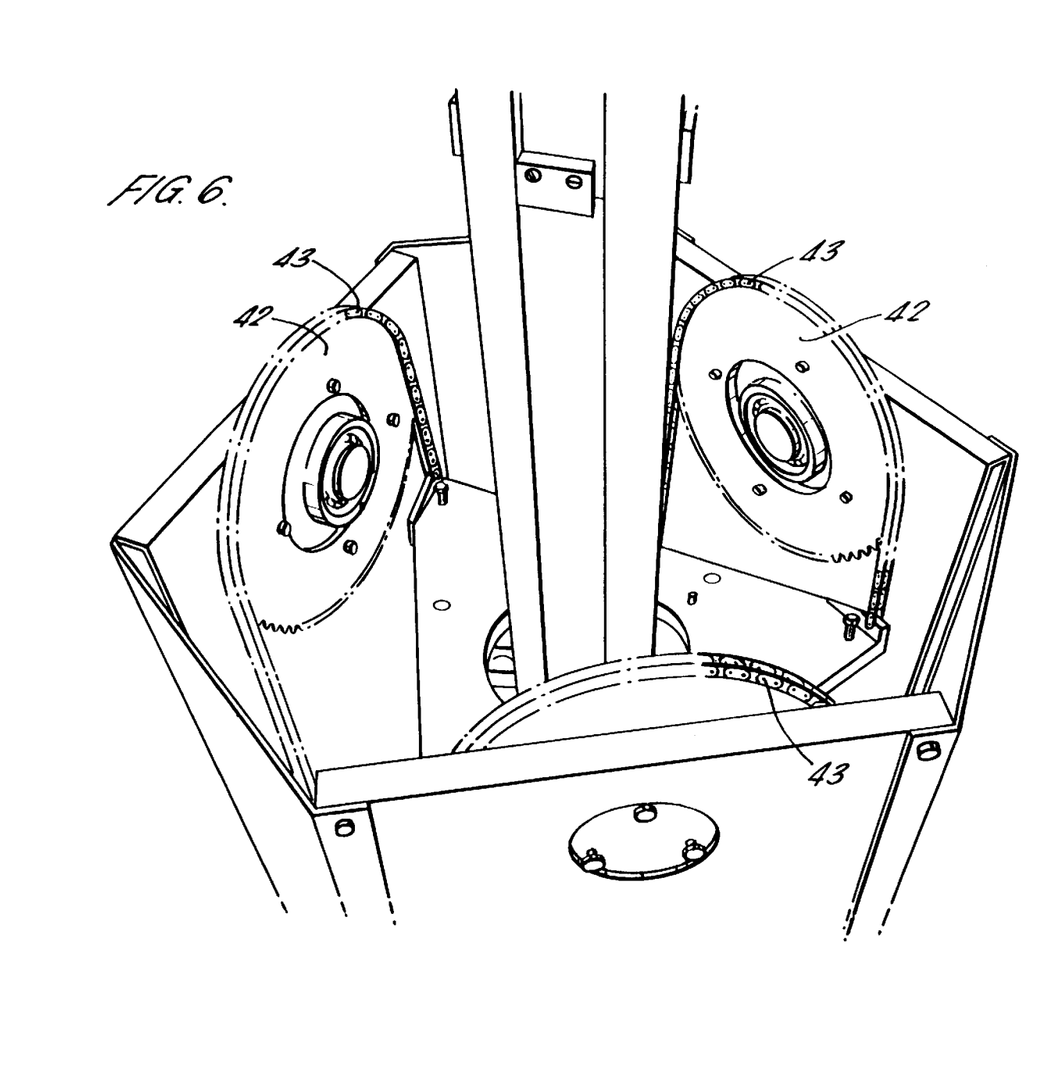
FIG. 6 is a detailed view of an upper part of the column of FIG. 5.

FIGS. 4, 5 and 6 show a prototype column embodying the principals set out above. The main difference is that the column is generally triangular in cross-section and has three external gas powered struts 50 in place of a single central strut and three sets of chain/sprocket drive connections between each respective pair of stages. The eccentric sprockets are indicated at 42 and their chain drives at 43.

Figure 7:
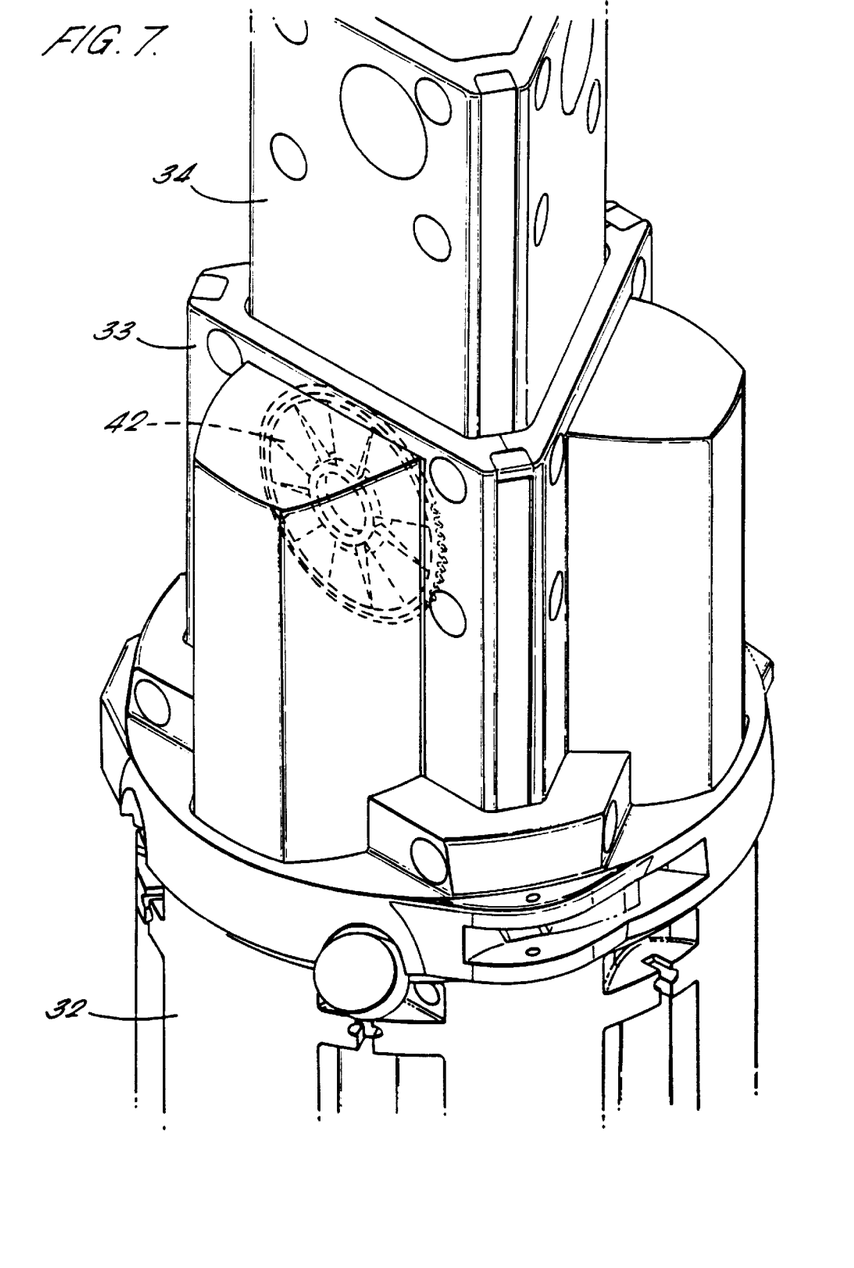
FIG. 7 is a similar view of FIG. 4 showing the column in its final form.

FIG. 7 is a perspective view of a final form of the column shown in prototype form in FIGS. 4 to 6 and like parts have been given the same reference numerals.

Earlier in the description it was indicated that the actual profile of the disc approximates very closely to the profile of an eccentric circle but that the actual profile used is developed mathematically to provide a true compensation for the varying force applied by the strut to provide a constant output. The mathematical analysis will now be summarised with reference to FIG. 8 of the drawings.

Figure 8:
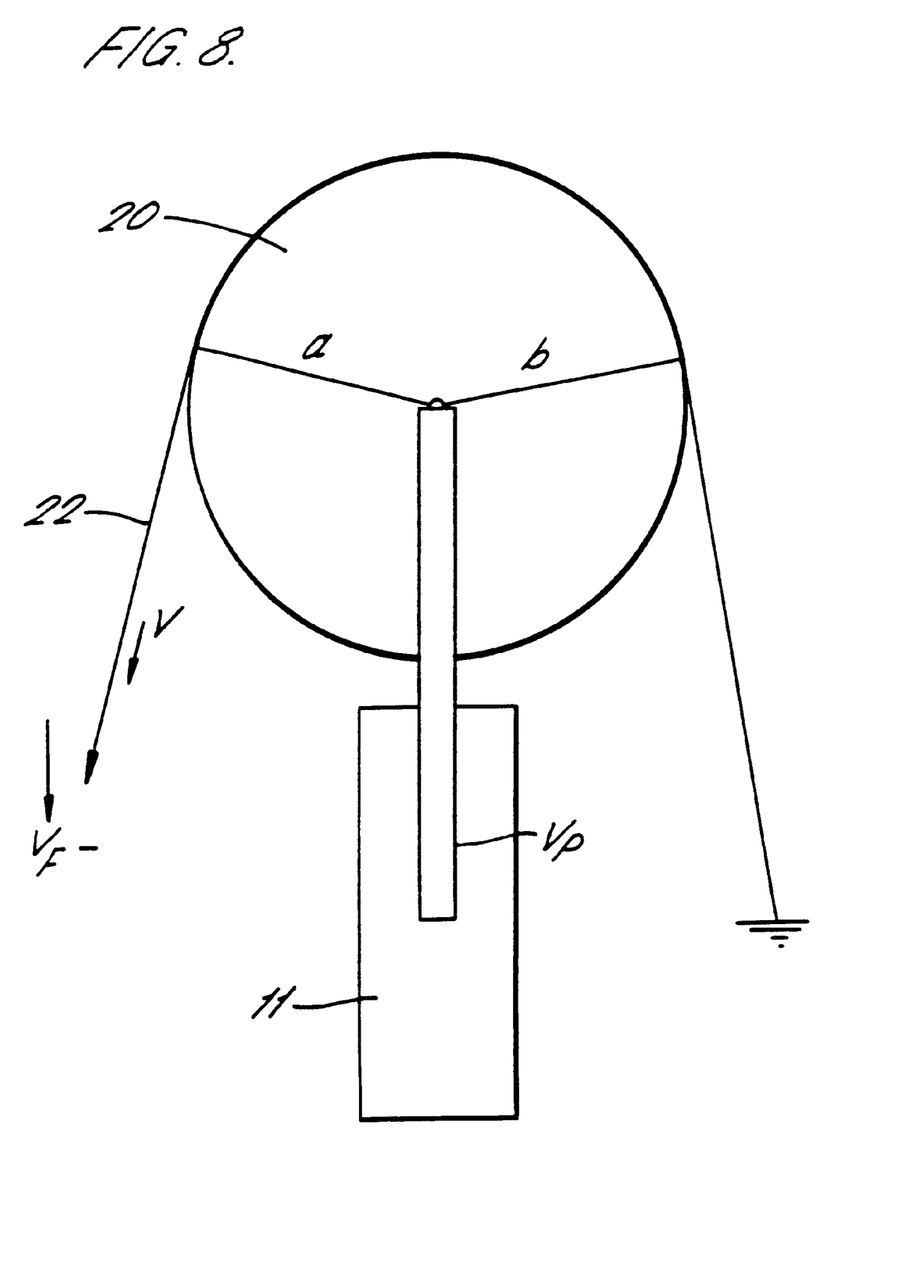
FIG. 8 is a force diagram for the linear actuator.

To achieve balance of the column throughout its range of movement the rate of change of energy at the constant load point must equal the rate of change of energy of the ram.

The following nomenclature will be used
F=constant balance force
$V_F$=the axial component of the velocity of the load
R=Ram force
$V_R$=Ram velocity
a and b are the instantaneous radii of the sprocket at the points of contact of the chain.

Thus $F \times V_F$ is=to $R \times V_R$ for continuing balance.
Therefore $$\frac{V_F}{V_R} \equiv \frac{R}{F}.$$

$$\frac{VF}{VP}$$

is a function of a and b.

$$\frac{R}{F}$$

and therefore $$\frac{V_F}{V_P}$$

are known so that a and b can be defined.

A value for "a" can be assumed and it is therefore possible to calculate values of "b", that is the varying radius of the profile of the disc or sprocket.

Figure 9:
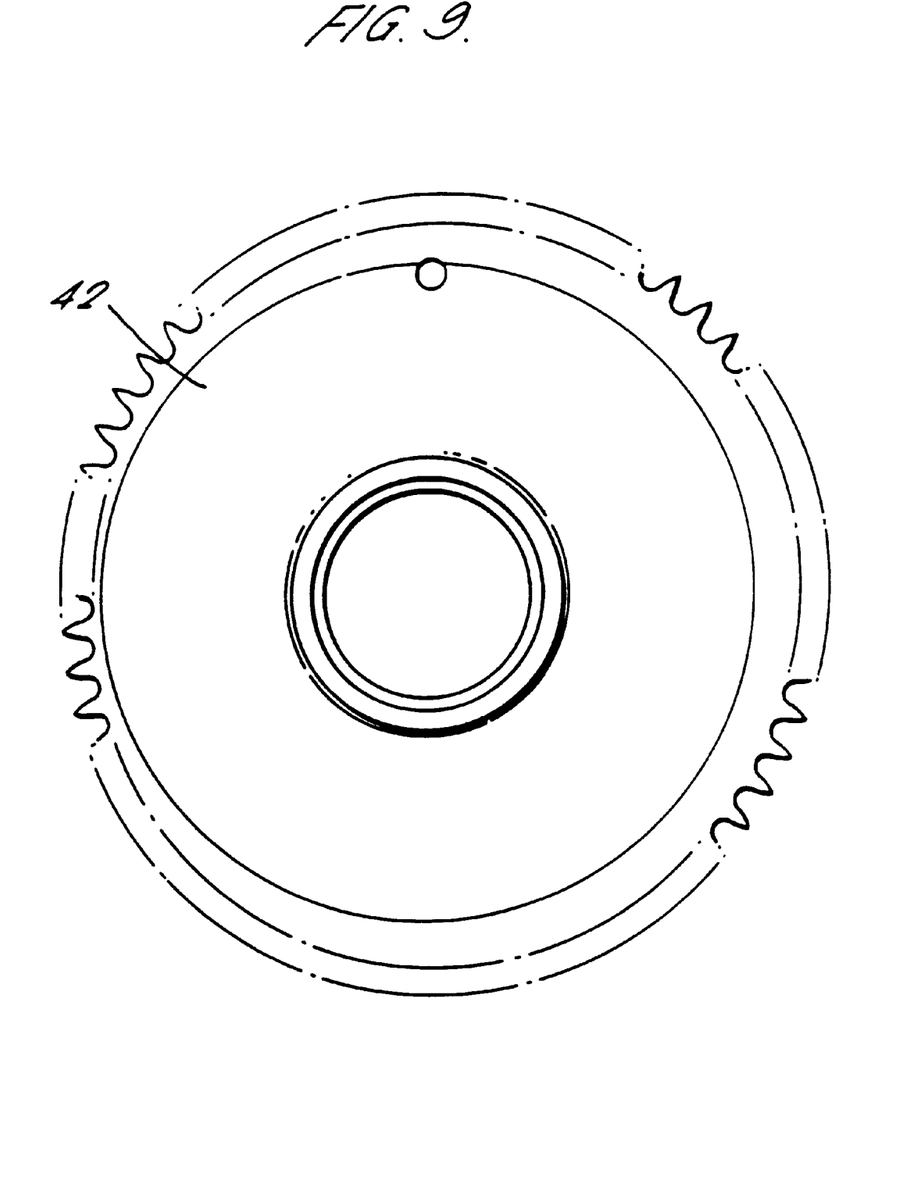
FIG. 9 shows a modified form of sprocket wheel for the linear actuator.

FIG. 9 illustrates a sprocket 40 having a profile developed in accordance with the above approach.

I claim:

1. A telescopically extendable column for a camera support platform having a plurality of interconnected stages, wherein the column is triangular in cross-section, the column comprising:

an extendable gas powered strut providing a force which varies with extension of the strut from a maximum force when the strut is fully retracted to a minimum force when the strut is fully extended;

first, second and third means for transmitting the force provided by the strut directly to a first one of the stages with a mechanical advantage which increases with extension of the strut and reduces with retraction of the strut to compensate for the variation in the force provided by the strut during extension and retraction of the strut to apply a substantially constant force to the first stage throughout the range of extension and retraction of the strut, each of the first, second and third force transmitting means being disposed on a respective side of the column between the first stage and a second one of the stages, each of the first, second and third force transmitting means comprising:

a drive wheel mounted for movement with the strut, a distance between an axis of rotation of each of the drive wheels and a periphery thereof varying around a perimeter of the drive wheel;

a flexible driving element extending around a part of the periphery of the corresponding drive wheel; and a positive driving connection between each of the flexible driving elements and the corresponding drive wheel, a first end of each flexible driving element being connected to a corresponding separate anchorage spaced from the corresponding drive wheel and a second end thereof applying a force to the second stage to transmit movement thereto in response to movement of the first stage, each of the drive wheels turning through up to approximately half a turn over the range of extension of the strut.

2. An extendable column as claimed in claim 1, wherein each drive wheel is substantially circular and is mounted on the first stage for rotation about an axis eccentric to its geometric center.

3. An extendable column as claimed in claim 1, wherein the radius of the periphery of each drive wheel varies around the wheel so that a ratio of an axial component of a load velocity to a strut velocity is equal to a ratio of the strut force to a load force.

4. An extendable column as claimed in claim 1, wherein the flexible driving elements are chains and the drive wheels are toothed sprockets with which the chains engage.

5. An extendable column as claimed in claim 1, wherein a bottom stage of the column is fixed on a base, a first moving stage carries the drive wheels and an upper stage of the column is adapted to carry a payload, the strut being mounted on the base and the first end of the flexible driving elements being anchored to the base and the second end of the flexible driving element being coupled to the upper stage to cause the column to extend and retract with a substantially constant force on the column to maintain the column supporting the payload in balance throughout its range of extension and retraction.

6. An extendable column as claimed in claim 5, wherein for each pair of adjacent stages up the column from the first moving stage to the upper stage, one to one driving connections are provided on each of the three sides of the column so that the further stages extend and contract with respect to one another in unison with the first moving stage.

7. A linearly extendible member as claimed in claim 6, wherein each one to one drive connection comprises a wheel mounted for rotation about its center on an upper portion of an upper one of the adjacent stages and a flexible element extending around the wheel to an anchorage at a lower portion of a lower one of the adjacent stages, to transmit movement between the adjacent stages.

\* \* \* \* \*

UNITED STATES PATENT AND TRADEMARK OFFICE
CERTIFICATE OF CORRECTION

PATENT NO.   : 6,073,903
DATED        : June 13, 2000
INVENTOR(S)  : Richard Arthur Lindsay It is certified that error appears in the above-identified patent and that said Letters Patent is hereby corrected as shown below:

Figures 1, 2 and 3 shown as Sheet 1 of 9, Sheet 2 of 9 and Sheet 3 of 9, are incorrect and should be replaced by the following attached Figures 1, 2 and 3.

Signed and Sealed this

Thirteenth Day of November, 2001

*Attest:*

*Attesting Officer*

NICHOLAS P. GODICI
*Acting Director of the United States Patent and Trademark Office*

FIG 3.